(12) United States Patent
Mizota et al.

(10) Patent No.: US 10,171,694 B2
(45) Date of Patent: Jan. 1, 2019

(54) CONVEYANCE DEVICE AND IMAGE FORMING DEVICE

(71) Applicant: KONICA MINOLTA, INC., Chiyoda-ku, Tokyo (JP)

(72) Inventors: Yutaka Mizota, Toyokawa (JP); Ichiro Muramatsu, Hamamatsu (JP); Akiyoshi Johdai, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 42 days.

(21) Appl. No.: 15/622,062

(22) Filed: Jun. 13, 2017

(65) Prior Publication Data

US 2017/0366692 A1 Dec. 21, 2017

(30) Foreign Application Priority Data

Jun. 21, 2016 (JP) .................................. 2016-122353

(51) Int. Cl.
*H04N 1/04* (2006.01)
*H04N 1/00* (2006.01)
*H04N 1/32* (2006.01)

(52) U.S. Cl.
CPC ..... *H04N 1/00588* (2013.01); *H04N 1/00204* (2013.01); *H04N 1/00596* (2013.01); *H04N 1/00602* (2013.01); *H04N 1/32496* (2013.01); *H04N 1/00* (2013.01); *H04N 2201/0013* (2013.01); *H04N 2201/0063* (2013.01); *H04N 2201/0081* (2013.01); *H04N 2201/0082* (2013.01); *H04N 2201/0086* (2013.01)

(58) Field of Classification Search
CPC ........... H04N 1/00588; H04N 1/00204; H04N 1/00596; H04N 1/00602; H04N 1/32496; H04N 1/00; H04N 2201/0013; H04N 2201/0063; H04N 2201/0081; H04N 2201/0082; H04N 2201/0086
USPC ................................. 358/488, 498, 486, 496
See application file for complete search history.

(56) References Cited

U.S. PATENT DOCUMENTS 5,101,284 A * 3/1992 Tanabe ..................... H04N 1/04
358/461
6,011,948 A * 1/2000 Amano .................... B65H 9/06
271/245

(Continued)

FOREIGN PATENT DOCUMENTS

JP            06087550 A     3/1994
JP         2007137618 A     6/2007

(Continued)

*Primary Examiner* — Cheukfan Lee
(74) *Attorney, Agent, or Firm* — Holtz, Holtz & Volek PC

(57) ABSTRACT

A conveyance device that conveys paper through a conveyance path along a surface thereof includes: a conveyance guide that has a guide surface to be a wall surface on one side of the conveyance path, an opening being formed in the guide surface; a paper detection unit at least including a detection member, which is arranged in a space that communicates with the conveyance path through the opening, and configured to detect, with the detection member, a leading end of the paper that reaches the opening; and a movable body that brings the detection member into a retracted state, in which a main part thereof is covered from the space, after the leading end of the paper is detected.

20 Claims, 8 Drawing Sheets

(56) References Cited

U.S. PATENT DOCUMENTS

| | | | | |
|---|---|---|---|---|
| 6,040,584 A * | 3/2000 | Liu | G01N 21/88 | 194/207 |
| 6,307,621 B1 * | 10/2001 | Endo | B65H 3/0615 | 346/134 |
| 6,409,043 B1 * | 6/2002 | Fujita | B65H 5/24 | 271/10.03 |
| 6,655,680 B1 * | 12/2003 | Huang | B65H 7/02 | 271/152 |
| 6,970,235 B2 * | 11/2005 | Christophersen | G07D 7/12 | 283/72 |
| 6,989,915 B2 * | 1/2006 | Honjo | H04N 1/00909 | 358/461 |
| 7,320,464 B2 * | 1/2008 | Matsuyama | H04N 1/0057 | 271/114 |
| 7,409,167 B2 * | 8/2008 | Inukai | G03G 15/50 | 399/11 |
| 7,532,854 B2 * | 5/2009 | Shin | B65H 29/14 | 399/405 |
| 8,243,343 B2 * | 8/2012 | Takashima | B41J 11/0035 | 358/461 |
| 8,564,239 B2 * | 10/2013 | Haruyama | G03G 15/6564 | 318/560 |
| 8,570,611 B2 * | 10/2013 | Tanaka | H04N 1/03 | 358/461 |
| 8,616,542 B2 * | 12/2013 | Min | B65H 29/6609 | 270/32 |
| 9,213,293 B2 * | 12/2015 | Tajima | G03G 15/5062 | |
| 9,242,823 B2 * | 1/2016 | Iizuka | B65H 7/08 | |
| 9,270,837 B1 * | 2/2016 | Whitesell | H04N 1/00018 | |
| 9,288,351 B2 * | 3/2016 | Hachisuga | H04N 1/00615 | |
| 9,621,758 B2 * | 4/2017 | O'Mara | H04N 1/1215 | |
| 9,738,473 B2 * | 8/2017 | Iizuka | B65H 7/08 | |
| 10,029,869 B2 * | 7/2018 | Sugiyama | B65H 5/062 | |
| 2003/0115071 A1 * | 6/2003 | Reid | H04N 1/00681 | 358/475 |
| 2003/0227126 A1 * | 12/2003 | Huang | B65H 7/02 | 271/110 |
| 2004/0207707 A1 * | 10/2004 | Ohashi | B41J 3/60 | 347/104 |
| 2004/0207708 A1 * | 10/2004 | Ohashi | B41J 3/60 | 347/104 |
| 2004/0217537 A1 * | 11/2004 | Ohama | B65H 15/00 | 271/3.14 |
| 2005/0012800 A1 * | 1/2005 | Ohashi | B41J 3/60 | 347/104 |
| 2005/0046686 A1 * | 3/2005 | Iwakura | B41J 3/60 | 347/104 |
| 2005/0141055 A1 * | 6/2005 | Sheng | H04N 1/00588 | 358/498 |
| 2007/0070450 A1 * | 3/2007 | Tanaka | H04N 1/00909 | 358/498 |
| 2007/0262511 A1 * | 11/2007 | Ohshima | B65H 3/56 | 271/10.01 |
| 2009/0002781 A1 * | 1/2009 | Luo | H04N 1/00681 | 358/498 |
| 2010/0085616 A1 * | 4/2010 | Shinno | H04N 1/00909 | 358/498 |
| 2010/0314827 A1 * | 12/2010 | Nishii | B65H 3/44 | 271/264 |
| 2011/0102865 A1 * | 5/2011 | Ishida | B08B 1/007 | 358/498 |
| 2011/0109945 A1 * | 5/2011 | Tsukahara | H04N 1/2032 | 358/461 |
| 2011/0164290 A1 * | 7/2011 | Nishikawa | H04N 1/00909 | 358/461 |
| 2011/0181922 A1 * | 7/2011 | Tanimoto | H04N 1/00543 | 358/474 |
| 2011/0303775 A1 * | 12/2011 | Kim | B02C 18/0007 | 241/34 |
| 2013/0003138 A1 * | 1/2013 | Sugizaki | H04N 1/401 | 358/461 |
| 2014/0009805 A1 * | 1/2014 | Matsumi | H04N 1/0066 | 358/509 |
| 2014/0092455 A1 * | 4/2014 | Iwatsuka | H04N 1/0057 | 358/498 |
| 2014/0211276 A1 * | 7/2014 | Kato | H04N 1/00816 | 358/488 |
| 2014/0361482 A1 * | 12/2014 | Iizuka | B65H 7/08 | 271/111 |
| 2015/0102551 A1 * | 4/2015 | Koga | B65H 7/06 | 271/110 |
| 2015/0341522 A1 * | 11/2015 | Sheng | H04N 1/00726 | 358/498 |
| 2017/0277100 A1 * | 9/2017 | Xu | G03G 15/607 | |
| 2017/0305697 A1 * | 10/2017 | Iizuka | B65H 7/08 | |

FOREIGN PATENT DOCUMENTS

| | | |
|---|---|---|
| JP | 2008247557 A | 10/2008 |
| JP | 2009258524 A | 11/2009 |
| JP | 2013043716 A | 3/2013 |

* cited by examiner

CONVEYANCE DEVICE AND IMAGE FORMING DEVICE

The entire disclosure of Japanese Patent Application No. 2016-122353 filed on Jun. 21, 2016 including description, claims, drawings, and abstract are incorporated herein by reference in its entirety.

BACKGROUND OF THE INVENTION

Field of the Invention

The present invention relates to a conveyance device and an image forming device.

Description of the Related Art

A copier, a sheetfed scanner, a facsimile device, a printer, a multi-functional peripheral (MFP), which includes functions of these, such as a multi-functional machine or a complex machine, or the like includes a conveyance device to convey paper. Paper conveyed by this kind of conveyance device is a document sheet on which an image to be read is recorded or a recording sheet used for printing of an image.

The conveyance device includes one or more paper sensors to detect a position of conveyed paper. A paper sensor is arranged at an appropriate position in a conveyance path and outputs a signal corresponding to existence/non-existence of paper in the arranged position (detection position).

When paper reaches the detection position, a signal from the paper sensor is changed from a state indicating that there is no paper into a state indicating that there is paper. That is, the paper sensor detects a leading end of the paper. The conveyance device starts driving a conveyance roller or the like in a downstream at timing, at which a leading end of paper is detected, or notifies a controller, which controls reading or printing, of arrival of paper at this timing.

Generally, a reflection-type or transmission-type optical sensor is used as a paper sensor. The optical sensor includes a light-emitting member that emits detection light toward a conveyance path, and a light-receiving member that receives detection light reflected on paper or transmitted through the conveyance path. The optical sensor detects paper on the basis of a difference in the amount of received light in a case where there is paper and a case where there is not.

Paper powder and different dust generated by conveyance of paper are attached onto the optical sensor, a wall surface of the conveyance path, or the like. As the dust is accumulated, the amount of emitted and received light varies and erroneous detection becomes likely to be caused. When the dust is accumulated on the optical sensor, detection light is blocked and the amount of light is decreased. In a case where a reflection-type optical sensor is used, when dust is accumulated on a wall surface of a conveyance path, the wall surface becomes whitish and reflectivity becomes high, whereby the amount of received light is increased.

As related technologies to prevent attachment of dust onto an optical sensor, there are technologies described in JP 2009-258524 A and JP 06-087550 A.

In JP 2009-258524 A, it is disclosed to prevent attachment of toner in an electrophotographic image forming device by covering a reflection-type optical sensor 110, which detects density of a toner image formed on a photoreceptor 3, with a member 130 that is opened/closed along with a movement of paper P.

In JP 06-087550 A, it is disclosed to prevent paper powder that falls through a light transmission window 4b from falling onto an element 3 by arranging elements 2 and 3 of a transmission-type optical sensor in such a manner as to face each other with an optical axis being inclined with respect to a conveyance surface and by providing the element 3 on a lower side of the conveyance surface away from a region 6 beneath the light transmission window 4b.

Also, as related technologies to prevent erroneous detection due to ambient light, there are technologies described in JP 2008-247557 A and JP 2013-043716 A.

In JP 2008-247557 A, it is disclosed to automatically or manually change a direction of a reflection-type optical sensor 60 provided in a paper-feeding tray in a case where the optical sensor 60 performs detection erroneously in a device that conveys a document sheet.

In JP 2013-043716 A, it is disclosed to provide a shielding plate 13 in a flag 12 actuated by a conveyed sheet, to make the shielding plate 13 face a reflection-type optical sensor until the sheet is conveyed, and to move the shielding plate 13 and detect the sheet when the sheet is conveyed.

Even in the above-described technologies of JP 2009-258524 A, JP 06-087550 A, JP 2008-247557 A, and JP 2013-043716 A, there is a problem that it is not possible to prevent erroneous detection due to attachment of dust in a case of detecting a leading end of paper.

That is, in the technology of JP 2009-258524 A, it is not possible to detect paper since a reflection-type optical sensor is arranged toward a photoreceptor not toward paper.

According to the technology of JP 06-087550 A, an optical axis is inclined with respect to a paper surface. Thus, inclination of a leading end of paper in a conveyance direction and a front/back direction greatly influences a shape of an irradiation spot compared to a case where an optical axis is vertical. Thus, it is difficult to secure detection accuracy. Also, there is a problem that a structure near a detection position becomes complicated.

With the technology of JP 2008-247557 A, it is possible to prevent erroneous detection, which is due to incidence of ambient light, by changing a direction. However, it is not possible to prevent erroneous detection due to attachment of dust.

With the technology of JP 2013-043716 A, it is possible to prevent attachment of dust when paper is not conveyed. However, it is not possible to prevent attachment of dust when paper is conveyed. Since most of the dust is paper powder that falls by friction between paper and a guide surface of conveyance, a lot of paper powder is attached even with the technology of JP 2013-043716 A.

SUMMARY OF THE INVENTION

The present invention has been made in view of the forgoing problems, and an object thereof is to prevent erroneous detection due to attachment of dust in a case of detecting a leading end of paper.

To achieve the abovementioned object, according to an aspect, a conveyance device that conveys paper through a conveyance path along a surface thereof, reflecting one aspect of the present invention comprises: a conveyance guide that has a guide surface to be a wall surface on one side of the conveyance path, an opening being formed in the guide surface; a paper detection unit at least including a detection member, which is arranged in a space that communicates with the conveyance path through the opening, and configured to detect, with the detection member, a leading end of the paper that reaches the opening; and a movable body that brings the detection member into a retracted state, in which a main part thereof is covered from the space, after the leading end of the paper is detected.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
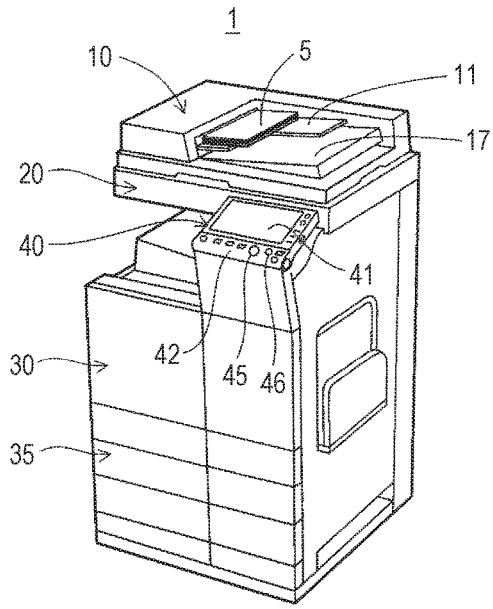
FIG. 1 is a view illustrating an outline configuration of an image forming device including a conveyance device according to an embodiment of the present invention.

FIG. 1 illustrates an outline configuration of an image forming device 1 including a conveyance device 10 according to an embodiment of the present invention.

The image forming device 1 is a multi-functional peripheral (MFP) such as a multi-functional machine or a complex machine which peripheral includes functions of a copier, a scanner, a facsimile device, a printer, and the like. The image forming device 1 includes a conveyance device 10, a flatbed scanner 20, a printer unit 30, a paper-feeding unit 35, and an operation panel 40.

The conveyance device 10 is an auto document feeder (ADF) that conveys document sheets 5 and 6 that are paper to be read. The conveyance device 10 can operate as a sheetfed scanner that reads one surface of each of the document sheets 5 and 6. The conveyance device 10 is provided in an openable/closable manner as a cover that covers a platen glass of the flatbed scanner 20. A configuration of an inner part of the conveyance device 10 will be described later in detail.

By forming an image, for example, with a reduction optical system, the flatbed scanner 20 reads a recorded image from the document sheets 5 and 6 conveyed by the conveyance device 10 or a document sheet, a book, other prints, or the like placed on the platen glass.

The printer unit 30 prints the image, which is read by the conveyance device 10 or the flatbed scanner 20, onto a sheet (recording paper) different from the document sheets 5 and 6. The printer unit 30 is also used to print a document input from an external host, an image received by facsimile communication, and the like. A method of printing is an electrophotographic method. However, the method may be an ink-jet method or any other methods.

The paper-feeding unit 35 includes a plurality of paper-feeding cassettes to house recording paper, feeds the recording paper with a pick-up roller from a selected paper-feeding cassette, and supplies the paper to the printer unit 30.

The operation panel 40 includes a touch-screen display 41 that displays a screen for input operation by a user and a key input unit 42 in which hardware keys such as a start key 45 and a stop key 46 are arranged. The operation panel 40 outputs a signal corresponding to the input operation. Operation of the image forming device 1 is controlled by a main control unit according to this signal.

Figure 2:
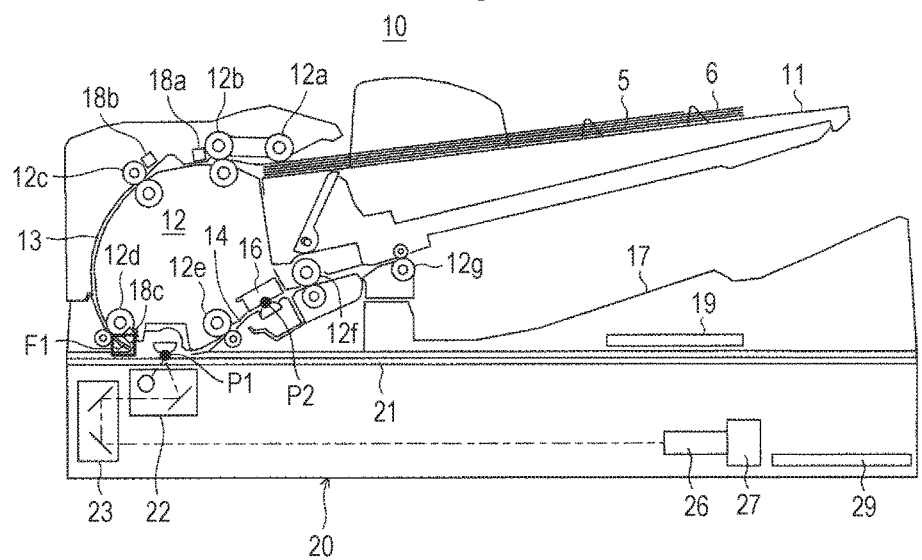
FIG. 2 is a view illustrating a whole configuration of the conveyance device.
Figure 3:
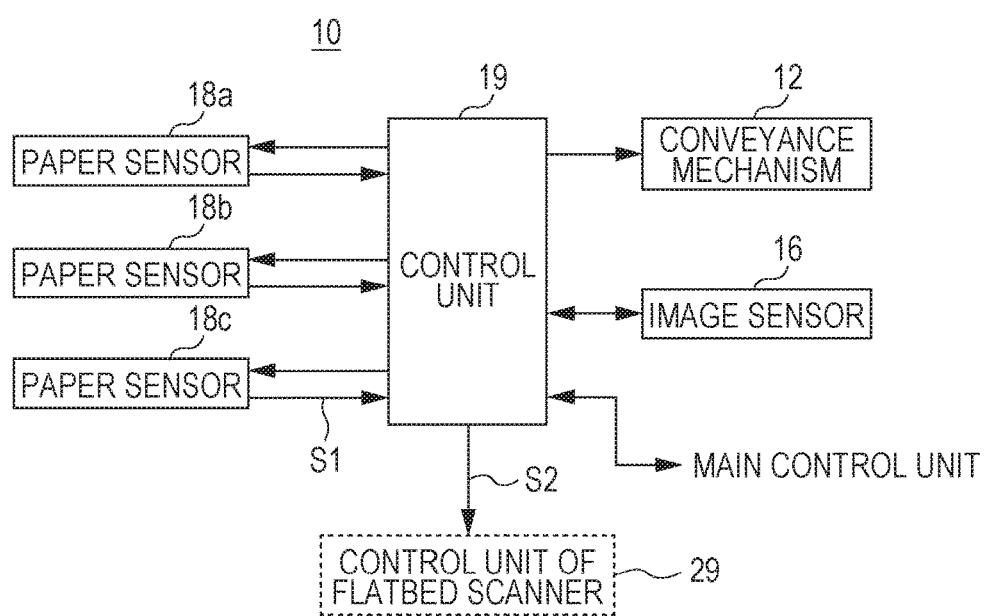
FIG. 3 is a view illustrating an outline configuration of an electric circuit of the conveyance device.

A whole configuration of the conveyance device 10 is illustrated in FIG. 2 and an outline configuration of an electric circuit of the conveyance device 10 is illustrated in FIG. 3.

The conveyance device 10 includes a document tray 11, a conveyance mechanism 12, conveyance paths 13 and 14, an image sensor 16, a copy receiving tray 17, a control unit 19, and the like. The conveyance paths 13 and 14 can let the A4-size document sheets 5 and 6 pass with short sides thereof being in a conveyance direction.

The conveyance mechanism 12 successively takes the plurality of document sheets 5 and 6, which are piled and set in the document tray 11, one by one from the document tray 11 and conveys the document sheets 5 and 6 toward a first reading position P1 in such a manner that the document sheets 5 and 6 pass through the conveyance path 13 along surfaces thereof. Moreover, the conveyance mechanism 12 conveys the document sheets 5 and 6 from the first reading position P1 to a second reading position P2 through the conveyance path 14 and subsequently ejects the document sheets 5 and 6 to the copy receiving tray 17. The conveyance mechanism 12 includes a pick-up roller 12a, a pair of separation rollers 12b, a pair of paper stop rollers 12c, a plurality of pairs of feeding rollers 12d, 12e, 12f, and 12g, paper sensors 18a, 18b, and 18c, a motor as a drive source, and the like.

The first reading position P1 is a position at which a first surface (front surface) of each of the document sheets 5 and 6 is read by an image sensor 27 of the flatbed scanner 20 and the second reading position P2 is a position at which a second surface (back surface) of each of the document sheets 5 and 6 is read by an image sensor 16 of the conveyance device 10.

Since the copy receiving tray 17 is arranged on a lower side of the document tray 11, the conveyance path 13 is substantially curved in a semi-circular shape. Each of the document sheets 5 and 6 is conveyed from an upper side to a lower side along this conveyance path 13 and passes through the first reading position P1 in a state in which the front and back thereof are reversed from a state of when being set in the document tray 11. Each of the document sheets 5 and 6 is ejected to the copy receiving tray 17 without the front and back thereof being reversed thereafter.

Under the first reading position P1, an optical unit 22 of the flatbed scanner 20 stays still and the document sheets 5 and 6 face the optical unit 22 through a platen glass 21.

Illumination light from the optical unit 22 is reflected on the first surfaces of the document sheets 5 and 6 and enters the image sensor 27 through a mirror in the optical unit 22, a reflecting mirror unit 23, and an imaging lens 26. Accordingly, images on the first surfaces of the conveyed document sheets 5 and 6 are read.

Also, the document sheets 5 and 6 face the image sensor 16 when passing through the second reading position P2. The image sensor 16 is, for example, a contact-type line sensor and reads images on the second surfaces of the conveyed document sheets 5 and 6.

Note that an opposed plate (background plate) that reflects illumination light for reading in a case where there are not the document sheets 5 and 6 is provided at each of the first reading position P1 and the second reading position P2.

The paper sensors 18a, 18b, and 18c respectively output, to the control unit 19, signals corresponding to existence/non-existence of the document sheets 5 and 6 at detection positions. The control unit 19 determines progress of conveyance on the basis of the signals from the paper sensors 18a, 18b, and 18c and performs drive control of a roller, and the like.

The paper sensor 18c is provided near a terminal of the conveyance path 13, that is, in vicinity of an upstream side of the first reading position P1. The control unit 19 transmits a leading-end detection signal S2, which indicates that leading ends of the document sheets 5 and 6 are detected, to a control unit 29 of the flatbed scanner 20 on the basis of a detection signal S1 output from the paper sensor 18c (see FIG. 3). On the basis of the leading-end detection signal S2, reading by the image sensor 27 is started at timing of conveyance of the document sheets 5 and 6.

In a main part surrounded and indicated by a square F1 in FIG. 2, a function to reduce an influence of paper powder and other dust in detection of leading ends of the document sheets 5 and 6 is provided. In the following, a configuration of the conveyance device 10 will be further described with a focus on this function.

Figure 4:
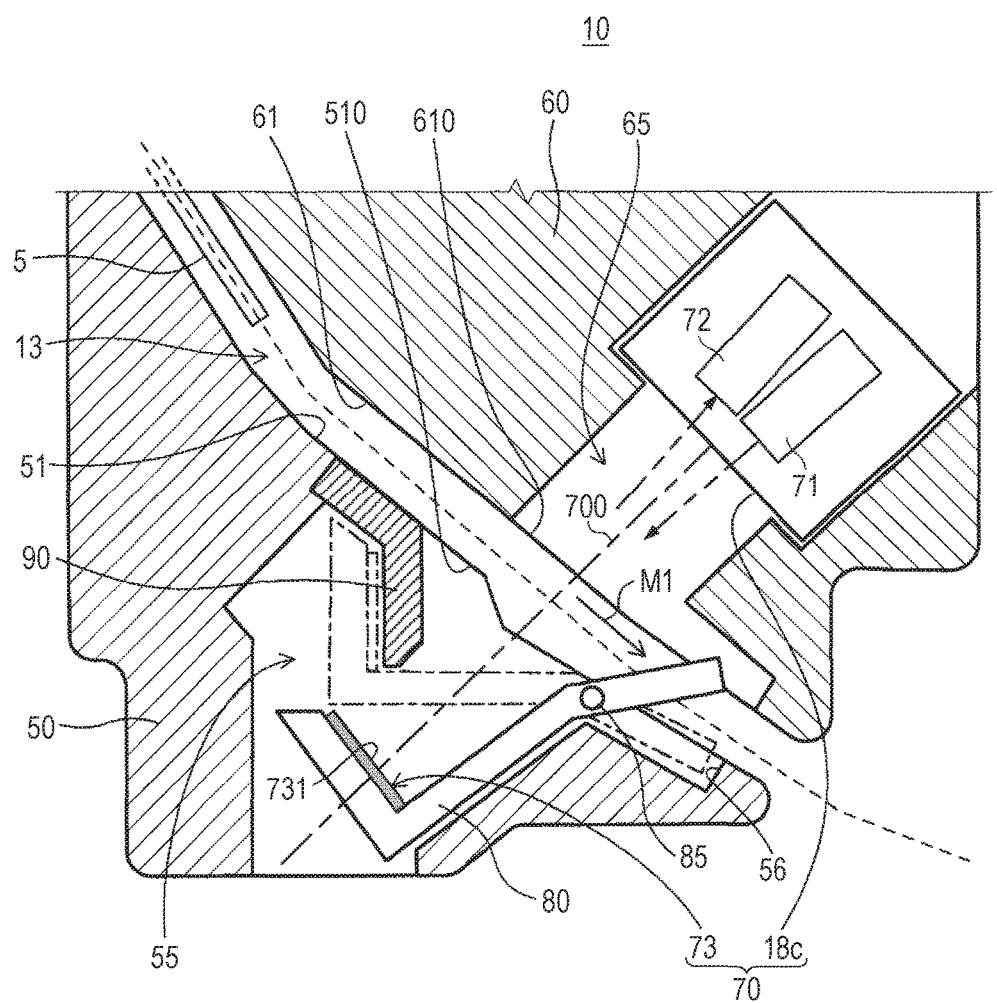
FIG. 4 is a view illustrating a first example of a cross-sectional structure of a main part of the conveyance device.
Figure 5:
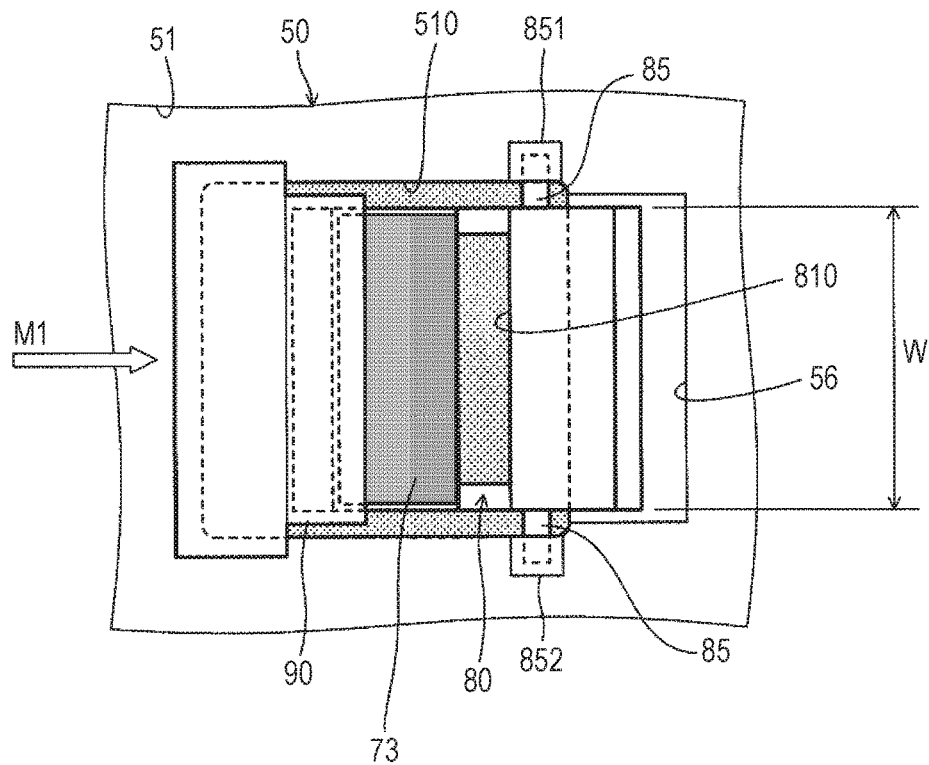
FIG. 5 is a view illustrating a configuration of a movable body in a planar view.
Figure 6:
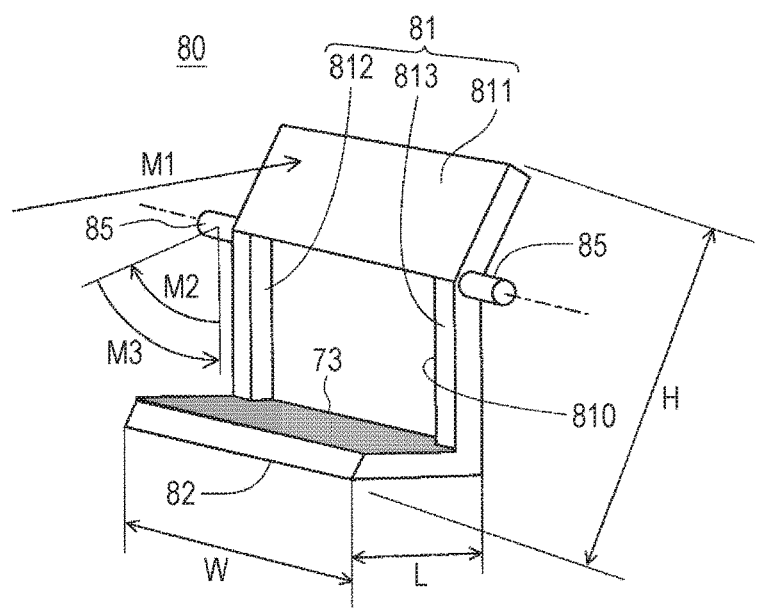
FIG. 6 is a view illustrating a three-dimensional structure of the movable body.
Figure 7:
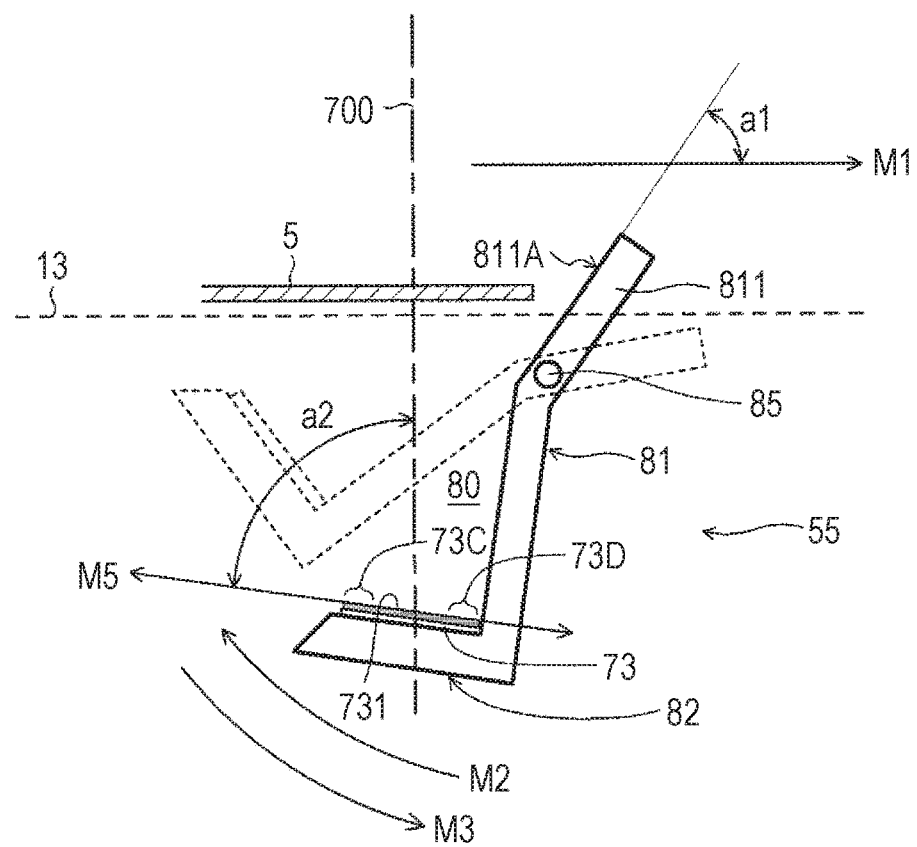
FIG. 7 is a view illustrating a configuration of the movable body in a side view.

A first example of a cross-sectional structure of the main part of the conveyance device 10 is illustrated in FIG. 4, a configuration of a movable body 80 in a planar view is illustrated in FIG. 5, a three-dimensional structure of the movable body 80 is illustrated in FIG. 6, and a configuration of the movable body 80 in a cross-sectional view is illustrated in FIG. 7.

As illustrated in FIG. 4, the conveyance device 10 includes conveyance guides 50 and 60, a paper detection unit 70, the movable body 80, and a wall body 90.

The conveyance guide 50 is a structure including a guide surface 51 to be a wall surface on a lower side (one side to be outer side of curve) near the terminal of the conveyance path 13. The guide surface 51 is curved in such a manner as to bend the document sheet 5 in a front/back direction. As illustrated well in FIG. 5, an opening 510 having a square shape in a planar view is formed in the guide surface 51. The conveyance guide 50 is created, for example, by resin molding in such a manner that a lower space 55 that communicates with the conveyance path 13 through the opening 510 and a depression 56 adjacent to the opening 510 are provided on an outer side of the curve of the guide surface 51.

The conveyance guide 60 is a structure including a guide surface 61 to be a wall surface on an upper side near a terminal of the conveyance path 13. The upper side is an example of a side facing the conveyance guide 50 through the conveyance path 13 (opposite side). In the guide surface 61, an opening 610 is formed at a position facing the opening 510 in the lower guide surface 51. The conveyance guide 60 is created in such a manner that an upper space 65 that communicates with the conveyance path 13 and the lower space 55 through the opening 610 is provided. The conveyance guide 60 may be also made of resin.

The paper detection unit 70 includes the paper sensor 18c as an upper detection member arranged in the upper space 65, and a reflection preventing member 73 as a lower detection member arranged in the lower space 55. By using the paper sensor 18c and the reflection preventing member 73, the paper detection unit 70 detects a leading end of the document sheet 5 that reaches the opening 510.

The paper sensor 18c is a reflection-type optical sensor including a light-emitting member 71 and a light-receiving member 72. The light-emitting member 71 is arranged on the upper side and emits detection light toward the lower space 55. The light-receiving member 72 is also arranged on the upper side and outputs, as a detection signal S1, a signal corresponding to the amount of received detection light emitted from the light-emitting member 71 and reflected on a surface of the document sheet 5.

The reflection preventing member 73 is a member to reduce the amount of received light in the light-receiving member 72 before the document sheet 5 reaches the opening 510. For example, a coating film in a dark color, a film in a dark color, or a flocked cloth in a dark color can be used as the reflection preventing member 73. Specifically, a flocked cloth is preferable in terms of prevention of erroneous detection since there is little gloss that is seen in a member with a smooth surface and the amount of received detection light can be reduced to almost zero by utilization of this.

In detection of a leading end of the document sheet 5, the reflection preventing member 73 is arranged at a position (not-retracted position) that intersects with a detection axis 700 of the paper detection unit 70. The detection axis 700 is a central axis in a direction toward an object in a space to be an object range of detection. In optical detection, a line of sight corresponds to the detection axis 700. In detection by a reflection-type optical sensor such as the paper sensor 18c, a virtual line that bisects an angle at which an optical axis of the light-emitting member 71 and an optical axis of the light-receiving member 72 intersect is a typical example of the detection axis 700. However, it is not necessary to strictly determine the detection axis 700. A region including one or both of the optical axes of the light-emitting member 71 and the light-receiving member 72 may be the detection axis 700. Also, one of the optical axes of the light-emitting member 71 and the light-receiving member 72 may be determined as the detection axis 700 for convenience.

By arrangement of the reflection preventing member 73 at the not-retracted position, there is only the reflection preventing member 73 in a field of view of the light-receiving member 72 at least until the document sheet 5 reaches the detection position of the paper sensor 18c.

In such a manner, when detection is performed with provision of the opening 510 and arrangement of the reflection preventing member 73, detection light emitted from the light-emitting member 71 travels from the opening 510 to the lower space 55 without being reflected on the guide surface 51, enters the reflection preventing member 73, and attenuates due to light absorption. Accordingly, it is possible to prevent the detection light from being reflected on a part other than the document sheet 5 and entering the light-receiving member 72 and to more securely detect a leading end of the document sheet 5. That is, it is possible to improve reliability of detection.

Also, even when the paper sensor 18c is arranged as close to the conveyance path 13 as possible for downsizing of the conveyance device 10, it is possible to distancea surface, which is irradiated with the detection light in a case where there is no document sheet 5, from the paper sensor 18c for a distance between the paper sensor 18c and the conveyance path 13 or longer. Accordingly, erroneous detection due to unnecessary reflection of light becomes less likely compared to a case where the opening 510 is not provided and the guide surface 51 itself is brought into a dark color by coating or attachment of a film.

However, when the document sheet 5 passes through the opening 510, paper powder and other dust scatter from the document sheet 5 to the lower space 55. When the reflection preventing member 73 is kept exposed to the lower space 55, dust is accumulated in the reflection preventing member 73 as the cumulative number of conveyed sheets is increased. Gradually, reflection of detection light due to a layer of dust becomes obvious and erroneous detection becomes likely.

It is only necessary to clean the reflection preventing member 73. However, it is troublesome to perform cleaning frequently. Specifically, in a case where a flocked cloth is used as the reflection preventing member 73, it is difficult to perform cleaning adequately and replacement with a new part is necessary in a time interval corresponding to a frequency of use of the conveyance device 10.

In order to reduce attachment of dust onto the reflection preventing member 73, the conveyance device 10 includes the movable body 80 to move the reflection preventing member 73, and a wall body 90 to cover a main part 731 of the reflection preventing member 73. The main part 731 of the reflection preventing member 73 is a surface on a side to which detection light from the light-emitting member 71 becomes incident.

The wall body 90 is, for example, a structure that is attached to the conveyance guide 50 in such a manner as to partially block the opening 510 and that is protruded to the lower space 55. The wall body 90 is provided on a lower side of the conveyance path 13 in such a manner that a top surface thereof is on the substantially same surface (flush surface) with the guide surface 51. A part of a back surface, which is seen from the conveyance path 13, of the wall body 90 becomes a wall surface that faces the reflection preventing member 73 and that covers the main part 731.

After a leading end of the document sheet 5 is detected, the movable body 80 is displaced in a manner indicated by a dashed-dotted line in the drawing and brings the reflection preventing member 73 into a retracted state in which the main part 731 thereof is covered from the lower space 55 with the wall body 90. A configuration of the movable body 80 is as follows.

As illustrated in FIG. 6, the movable body 80 is a structure in which a lever unit 81, a plate unit 82, and a projection to be a shaft 85 are integrated and is made of resin, for example. A width W of the movable body 80 excluding the shaft 85 (size in width direction that is orthogonal to conveyance direction M1 and in parallel with horizontal plane) is around 20 to 30 mm and is 20 mm, for example. A height H (size in height direction that is orthogonal to width direction) is around 10 to 20 mm and is 12 mm, for example.

The lever unit 81 includes a plate-like part 811 that comes into contact with the document sheets 5 and 6, and pillar parts 812 and 813 protruded from both ends in the width direction of the plate-like part 811. The shaft 85 is provided near a boundary of the plate-like part 811 and the pillar parts 812 and 813.

As a part to support the reflection preventing member 73, the plate unit 82 is coupled to ends of the pillar parts 812 and 813 in the lever unit 81. The plate unit 82 is substantially orthogonal to the pillar parts 812 and 813. The reflection preventing member 73 is fixed to a surface facing upward of the plate unit 82. A size L of the plate unit 82 in a short side direction in the conveyance direction M1 is around 5 to 10 mm and is 5 mm, for example.

The plate-like part 811 and the plate unit 82 are coupled to each other with the pillar parts 812 and 813, whereby the movable body 80 is formed in a shape in which a square hole 810 is provided between the plate-like part 811 and the plate unit 82. Accordingly, an area of a surface onto which dust may be attached is decreased compared to a case where the hole 810 is not formed and most of the dust falls to a lower side. Thus, the amount of dust attached to the lever unit 81 and the amount of dust that moves from the lever unit 81 to the reflection preventing member 73 and that is accumulated therein can be decreased.

Note that the plate-like part 811 and the plate unit 82 may be coupled to each other only with either one of the pillar parts 812 and 813 and a notch that is a hole 810 one end in a width direction of which is released may be provided instead of the hole 810.

As illustrated in FIG. 7, the movable body 80 is arranged in such a manner that the plate-like part 811 that is one end part of the lever unit 81 is protruded from the lower space 55 to the conveyance path 13. The movable body 80 can be rotated around the shaft 85 provided on the lower side of the conveyance path 13. As illustrated in FIG. 5, the movable body 80 is supported by the conveyance guide 50 with a position thereof being determined by engagement of the shaft 85 with bearings 851 and 852 of the conveyance guide 50.

As illustrated in FIG. 4, when the conveyed document sheet 5 is abutted to the plate-like part 811, the lever unit 81 and the plate unit 82 are rotated integrally in a retraction direction M2. That is, the movable body 80 is pushed and displaced by the document sheet 5. Along with this, the reflection preventing member 73 is moved toward the wall body 90. When the movable body 80 is displaced for a degree that the plate-like part 811 becomes substantially in parallel with the conveyance direction M1, the reflection preventing member 73 becomes a retracted state.

Around when the document sheet 5 passes or is about to pass and the movable body 80 is no longer pushed by the document sheet 5, the movable body 80 is rotated (displaced) in a returning direction M3 in such a manner as to be moved back by own weight or by restoring force of a spring (not illustrated) and brings the reflection preventing member 73 into a not-retracted state from the retracted state. The not-retracted state is a state of arrangement at a not-retracted position effective for detection and is a state in which the main part 731 of the reflection preventing member 73 is not covered from the lower space 55.

In the not-retracted state, a front-surface direction M5 of the main part 731 of the reflection preventing member 73 is inclined to intersect with the detection axis 700 at an angle a2 that is not the right angle. More specifically, the front-surface direction M5 of the main part 731 is inclined in such a manner that a front side 73C in the retraction direction M2 of the main part 731 is closer to the conveyance path 13 than a rear side 73D is.

By inclination of the front-surface direction M5 to the detection axis 700, it is possible to reduce, with the reflection preventing member 73, incidence of regularly-reflected detection light to the light-receiving member 72 and to more securely reduce the amount of light received by the light-receiving member 72 in a case where there are not the document sheets 5 and 6. Also, when inclination is performed in such a manner that the front side 73C is closer to the conveyance path 13, the front-surface direction M5 and the detection axis 700 do not become orthogonal to each other during rotation. Thus, it is possible to prevent erroneous detection due to regular reflection during the rotation.

Also, at least when being abutted to the document sheets 5 and 6, a surface 811A of the plate-like part 811 of the lever unit 81 which surface is abutted to the document sheets 5 and 6 is inclined to intersect with the conveyance direction M1 at an angle a1 that is not the right angle in such a manner that a side close to a leading end of the plate-like part 811 is on a downstream side in conveyance of a side far therefrom. Accordingly, it is possible to reduce impact of collision of the document sheets 5 and 6 with the movable body 80 and to rotate the movable body 80 without losing smoothness in conveyance of the document sheets 5 and 6.

Figure 8A:
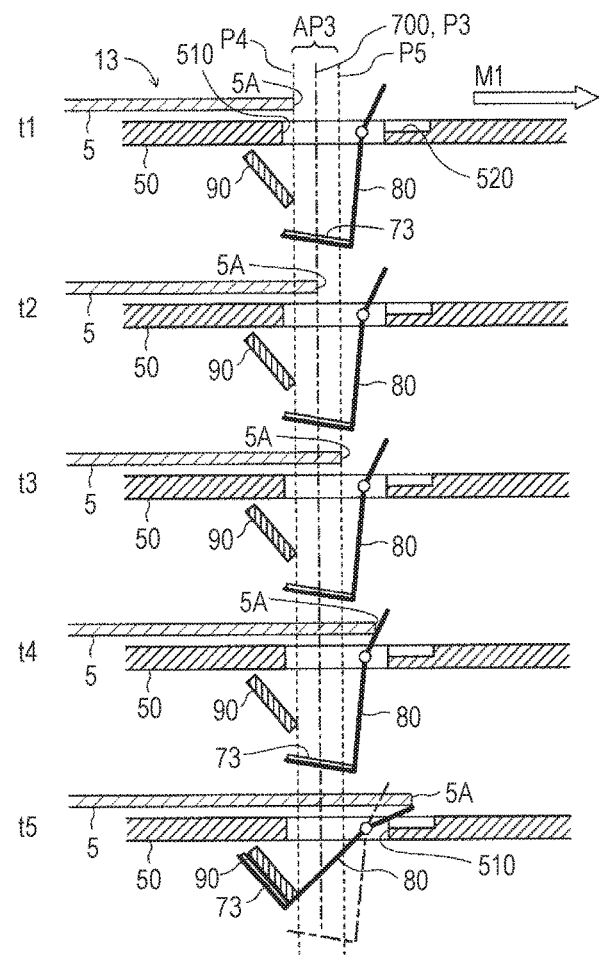
FIGS. 8A and 8B are views schematically illustrating operation and an action of the main part of the conveyance device.
Figure 8B:
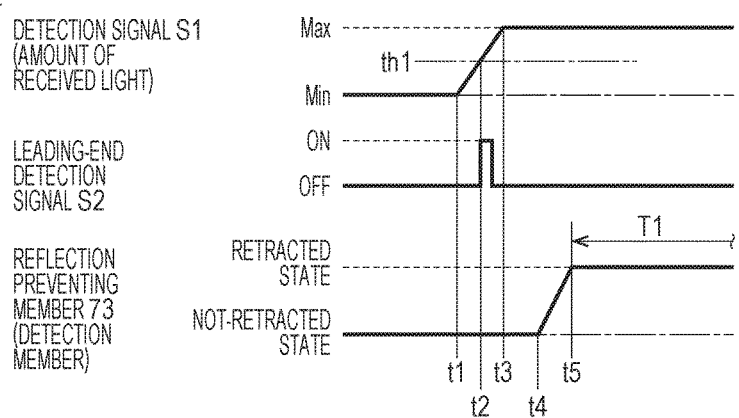
Figure 9A:
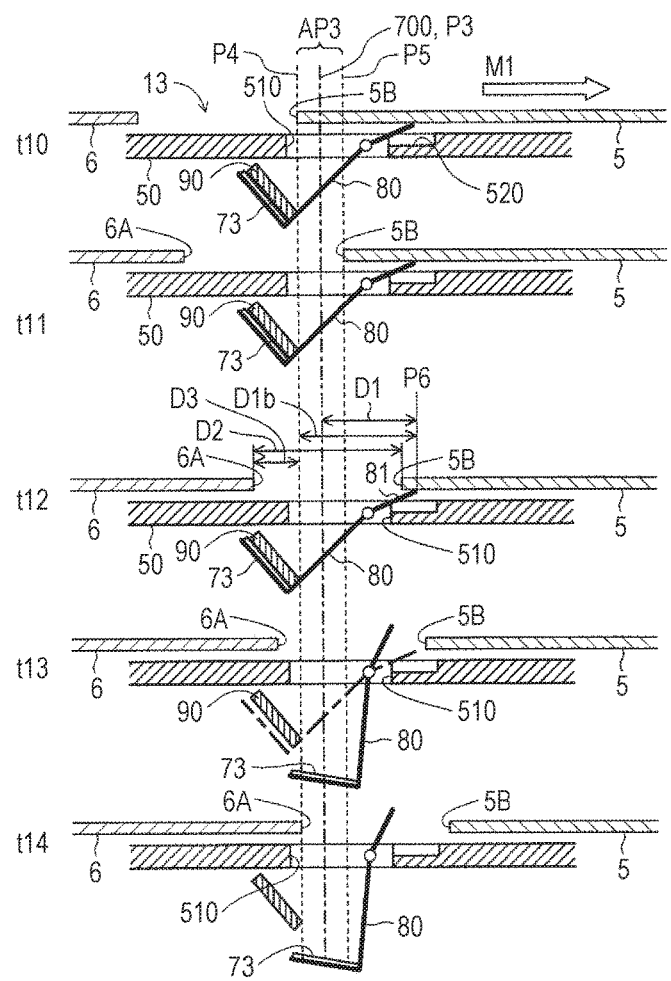
FIGS. 9A and 9B are views schematically illustrating operation and an action of the main part of the conveyance device.
Figure 9B:
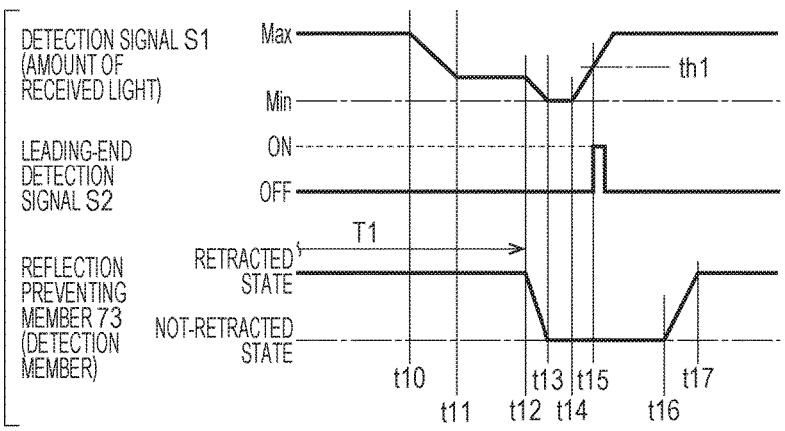

In FIGS. 8A, 8B, 9A, and 9B, operation and an action of the main part of the conveyance device 10 are schematically illustrated. More specifically, a process of displacement of the movable body 80 from the not-retracted state to the retracted state is illustrated in FIG. 8A, and an example of timing of the displacement is illustrated in FIG. 8B. A process of displacement of the movable body 80 from the retracted state to the not-retracted state is illustrated in FIG. 9A, and an example of timing of the displacement is illustrated in FIG. 9B.

A detection position range AP3 indicated by a dotted line in each of FIGS. 8A and 9A is a positional range in the conveyance direction M1 and is a substantial field of view of detection in which field a detection signal S1 from the light-receiving member 72 varies along with conveyance of the document sheets 5 and 6 in a case where the reflection preventing member 73 is in the not-retracted state.

As illustrated in FIGS. 8A and 8B, a leading end 5A of the document sheet 5 reaches the opening 510, travels a little farther, and just reaches an upstream end P4 of the detection position range AP3 at time t1. At the time t1, a value of the detection signal S1 is a minimum value (Min) in a dynamic range.

At time t2, the leading end 5A of the document sheet 5 just reaches a position of the detection axis 700. A value of the detection signal S1 is a median value in the dynamic range. In the example of FIGS. 8A and 8B, this median value is set as a threshold th1 for determination whether there is the document sheet 5. Thus, at the time t2, the paper sensor 18c detects the leading end 5A of the document sheet 5 and a leading-end detection signal S2 generated inside the control unit 19 is changed from an OFF level to an ON level. Note that the leading-end detection signal S2 is changed back to the OFF level before a leading end 6f of the following document sheet 6 is detected.

The threshold th1 is not limited to the median value in the dynamic range and only needs to be a value larger than the minimum value in principle. For example, a value between the median value and a maximum value (Max) may be set as the threshold th1. In either case, a substantial detection position P3 of the paper sensor 18c, that is, a position to detect the leading end 5A of the document sheet 5 is determined by setting of the threshold th1. As described above, in a case where the threshold th1 is the median value, the detection position P3 is substantially at the position of the detection axis 700.

At time t3, the leading end 5A of the document sheet 5 just reaches a downstream end P5 of the detection position range AP3. A value of the detection signal S1 becomes the maximum value.

At time t4, the leading end 5A of the document sheet 5 is abutted to the movable body 80 and a rotation of the movable body 80 is started. That is, transition from the not-retracted state to the retracted state is started.

At time t5, the leading end 5A of the document sheet 5 passes through the downstream end P5 of the opening 510. Transition from the not-retracted state to the retracted state is just finished and the movable body 80 is stopped at a retracted position (terminal position of rotation) at which the reflection preventing member 73 becomes the retracted state. Subsequently, the movable body 80 is brought into a state of being pushed by the document sheet 5 from the above and keeps, without being displaced for a period T1 in which the state is kept, the reflection preventing member 73 in the retracted state.

As illustrated in FIGS. 9A and 9B, a rear end 5B of the document sheet 5 just reaches the upstream end P4 of the detection position range AP3 at time t10. The reflection preventing member 73 is in the retracted state. A value of the detection signal S1 is the maximum value at the time t10 and is decreased thereafter as the conveyance progresses.

At time t11, the rear end 5B of the document sheet 5 just reaches the downstream end P5 of the detection position range AP3. The movable body 80 is still pushed by the document sheet 5 and is stopped and the reflection preventing member 73 is in the retracted state. Since the reflection preventing member 73 is not in the detection position range AP3, the value of the detection signal S1 is only decreased to a value larger than the minimum value.

At time t12, the rear end 5B of the document sheet 5 passes through the opening 510 but is abutted to the movable body 80. The reflection preventing member 73 is in the retracted state. That is, the movable body 80 is pushed by the document sheet 5 and keeps the reflection preventing member 73 in the retracted state at least until the rear end 5B of the document sheet 5 passes through the opening 510.

However, at the time t12, force of the document sheet 5 to push the movable body 80 is almost gone and the movable body 80 is about to start a rotation for moving back. Here, the following document sheet 6 is getting closer to the opening 510.

Here, a relationship between a distance between sheets of paper D2 and the movable body 80 of when the plurality of document sheets 5 and 6 is successively conveyed will be described.

In order to detect a leading end 6A of the following document sheet 6 correctly, it is preferable that the reflection preventing member 73 is back to the detection position range AP3 and a value of the detection signal S1 becomes the minimum value before the leading end 6A reaches the detection position P3. That is, it is necessary that the following document sheet 6 reaches the detection position P3 after the leading document sheet 5 no longer pushes the movable body 80 and the movable body 80 is back to the not-retracted position.

Accordingly, the movable body 80 is provided in such a manner that a condition that "a distance D1 between an edge position P6 on a downstream side in conveyance in a part of the lever unit 81, which part is abutted to the document sheet 5, in a case where the reflection preventing member 73 is in the retracted state and the detection position P3 is shorter than the distance between sheets of paper D2" is satisfied.

In the example of FIGS. 9A and 9B, a distance D1*b* (D1*b*>D1) between the edge position P6 and the upstream end P4 of the detection position range AP3 is shorter than the distance between sheets of paper D2. In other words, the control unit 19 controls timing of operation of the conveyance mechanism 12 in such a manner that the distance between sheets of paper D2 becomes longer than the distance D1*b* for a predetermined distance D3. The predetermined distance D3 is a distance that is a conveyance distance for a period of time necessary for a rotation of the movable body 80 by own weight or restoring force of a spring to which distance a margin value is added. By selection of the distance D1*b* and the distance between sheets of paper D2 in such a manner, it is possible to securely bring the reflection preventing member 73 into the not-retracted state before the following document sheet 6 reaches the detection position P3.

At time t13, the reflection preventing member 73 is back to the not-retracted state. The leading end 6A of the document sheet 6 is about to reach the opening 510.

At time t14, the leading end 6A of the document sheet 6 just reaches the upstream end P4 of the detection position range AP3. A value of the detection signal S1 is the minimum value at the time t14 and is increased thereafter as the conveyance progresses.

Then, in a manner similar to when the document sheet 5 passes through the detection position P3, the leading end 6A of the document sheet 6 reaches the detection position P3 and the leading-end detection signal S2 becomes the ON level at time t15. At time t16, the movable body 80 is pushed by the document sheet 6 and starts rotating. At time t17, the reflection preventing member 73 is brought into the retracted state.

Figure 10:
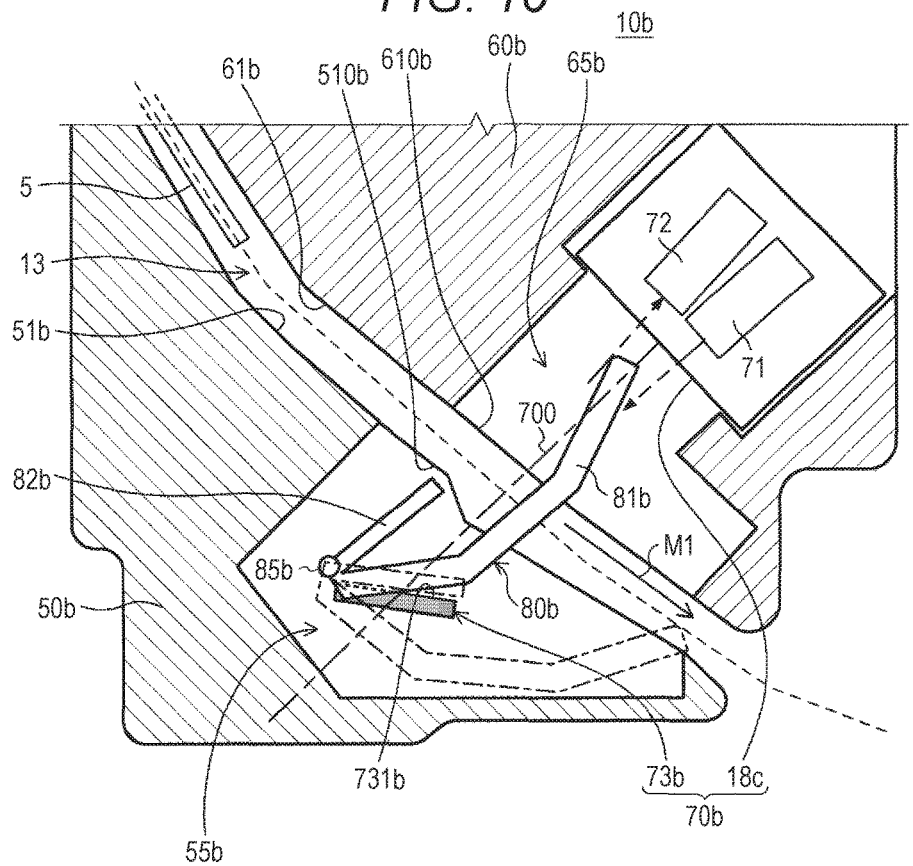
FIG. 10 is a view illustrating a second example of a cross-sectional structure of a main part of a conveyance device.
Figure 11:
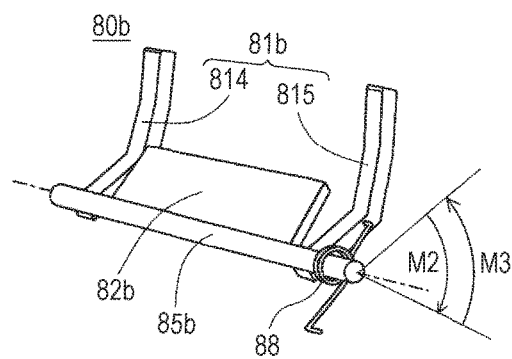
FIG. 11 is a view illustrating a three-dimensional structure of a movable body.

A second example of a cross-sectional structure of a main part of a conveyance device 10*b* is illustrated in FIG. 10, and a three-dimensional structure of a movable body 80*b* is illustrated in FIG. 11.

The main part of the conveyance device 10*b* illustrated in FIG. 10 is a part surrounded and indicated by the square F1 in FIG. 2 and a basic configuration thereof is similar to the configuration of the first example illustrated in FIG. 4. A difference from the first example is a configuration of the movable body 80*b* and a peripheral thereof.

In the first example described above, the reflection preventing member 73 is moved to bring the reflection preventing member 73 into the retracted state. On the other hand, in the second example, a reflection preventing member 73*b* is arranged fixedly and a plate unit 82*b* corresponding to a wall body that covers a main part 731*b* of the reflection preventing member 73*b* is moved to bring the reflection preventing member 73*b* into a retracted state. The plate unit 82*b* is a part of the movable body 80*b*.

As illustrated in FIG. 10, the conveyance device 10*b* includes conveyance guides 50*b* and 60*b*, a paper detection unit 70*b*, the reflection preventing member 73*b*, and the movable body 80*b*. These configuration elements correspond to the conveyance guides 50 and 60, the paper detection unit 70, the reflection preventing member 73, and the movable body 80 illustrated in FIG. 4. In the following, an overlapped description about these configuration elements will be omitted.

The conveyance guide 50*b* is a structure having a guide surface 51*b* to be a wall surface on a lower side near a terminal of a conveyance path 13. An opening 510*b* to prevent reflection of detection light is formed in the guide surface 51*b*. The conveyance guide 50*b* is created in such a manner that a lower space 55*b* that communicates with the conveyance path 13 through the opening 510*b* is provided on an outer side of a curve of the guide surface 51*b*.

The conveyance guide 60*b* is a structure having a guide surface 61*b* to be a wall surface on an upper side near a terminal of the conveyance path 13. In the guide surface 61*b*, an opening 610*b* is formed at a position facing the opening 510*b* in the lower guide surface 51*b*. The conveyance guide 60*b* is created in such a manner that an upper space 65*b* that communicates with the conveyance path 13 and the lower space 55*b* through the opening 610*b* is provided.

The paper detection unit 70*b* includes a paper sensor 18*c* as an upper detection member, and a reflection preventing member 73*b* as a lower detection member arranged in the lower space 55*b*. By using the paper sensor 18*c* and the reflection preventing member 73*b*, the paper detection unit 70*b* detects a leading end of a document sheet 5 that reaches the opening 510*b*.

The reflection preventing member 73*b* is, for example, a flocked cloth and is fixed to a supporting body (not illustrated) in such a manner as to face a light-receiving member 72 in the lower space 55*b* with a front-surface direction being inclined to a detection axis 700. By inclination of the front-surface direction to the detection axis 700, it is possible to more securely reduce incidence of detection light into the light-receiving member 72 which light is regularly reflected on the reflection preventing member 73*b* in a case where there are not document sheets 5 and 6.

After a leading end of the document sheet 5 is detected, the movable body 80*b* brings the reflection preventing member 73*b* into a retracted state in which a main part thereof is covered from the lower space 55*b*. A configuration of the movable body 80*b* is as follows.

As illustrated in FIG. 11, the movable body 80*b* is a structure in which a lever unit 81*b*, a plate unit 82*b*, and a shaft 85*b* are integrated. A size of the movable body 80*b* is about the same with that of the movable body 80 in FIG. 6.

The lever unit 81*b* includes two arms 814 and 815 which are arranged separately in parallel and one end of each of which is coupled to the shaft 85*b*. However, there may be only one arm. One of the arms 814 and 815 may be omitted. A part on the other end side of each of the arms 814 and 815 is a part abutted to a document sheet. Each of the arms 814 and 815 has a shape has a bent or curved shape in such a manner that a stroke of a rotation due to a push by a document sheet becomes large.

The plate unit 82*b* has a square tabular shape and is coupled to the shaft 85*b* as a cover that covers the reflection preventing member 73*b*. The plate unit 82*b* is provided between the arms 814 and 815 and is projected from the shaft 85*b* to the same side with the arms 814 and 815. However, an angle position of the projection is different.

A spring 88 is provided to the movable body 80*b* in order to move the movable body 80*b* back by a rotation in an opposite direction when the movable body 80*b* is no longer pushed by a document sheet after being pushed and rotated by the document sheet.

The lever unit 81*b* includes the arms 814 and 815 separated from each other, whereby the movable body 80*b* is formed in a shape in which a notch is provided between the arms 814 and 815. Accordingly, compared to a case where the lever unit 81*b* is tabular and has no notch, an area of a surface onto which dust may be attached is decreased and most of the dust falls to a lower side. Thus, it is possible to reduce the amount of dust attached to the lever unit 81*b* and the amount of dust that moves from the lever unit 81*b* to the reflection preventing member 73*b*.

In order to reduce impact of when the arms 814 and 815 are abutted to a document sheet, the movable body 80b is arranged in such a manner that an abutted surface is inclined to a downstream side in conveyance at least when being abutted to the document sheet.

Referring back to FIG. 10, the movable body 80b is arranged in such a manner that a part of the lever unit 81b is protruded from the lower space 55b to the conveyance path 13. The movable body 80b can be rotated around the shaft 85b provided on a lower side of the conveyance path 13.

When the conveyed document sheet 5 is abutted to the lever unit 81b, the lever unit 81b and the plate unit 82b are rotated integrally. When the movable body 80b is pushed by the document sheet 5 and is displaced in a manner indicated by a dashed-dotted line in the drawing, the plate unit 82b becomes adjacent to a main part of the reflection preventing member 73b or comes in contact therewith and the reflection preventing member 73b is brought into a retracted state.

Subsequently, around when the document sheet 5 is about to pass through the conveyance path 13, the movable body 80b is no longer pushed by the document sheet 5, rotated by restoring force of the spring 88, and moved back. The reflection preventing member 73b is brought into a not-retracted state to face the light-receiving member 72 without being covered with the plate unit 82b.

Note that in order to more securely prevent erroneous detection due to unnecessary reflection, a configuration, an arrangement position, and the like of the movable body 80b are determined in such a manner that the plate unit 82b does not become orthogonal to the detection axis 700 during a rotation and in a still state.

Also, in the second example of FIG. 10, a condition that "a distance between an edge position on a downstream side in the movable body 80b in a case where the reflection preventing member 73b is in the retracted state and a detection position is shorter than a distance between sheets of paper" is satisfied in such a manner that the leading ends 5A and 6A of the plurality of document sheets 5 and 6 that are successively conveyed can be detected.

According to the above embodiment, in a case of detecting the leading ends 5A and 6A of the document sheets 5 and 6 with the reflection-type paper sensor 18c and the reflection preventing members 73 and 73b, the reflection preventing members 73 and 73b are in the retracted state after the leading ends 5A and 6A are detected and until the document sheets 5 and 6 pass through the openings 510 and 510b. Accordingly, it is possible to reduce attachment of dust onto the reflection preventing members 73 and 73b and to prevent erroneous detection due to attachment of the dust.

However, the reflection preventing members 73 and 73b are not necessarily in the retracted state up until the document sheets 5 and 6 completely pass through the openings 510 and 510b. As long as the reflection preventing members 73 and 73b are in the retracted state at least when a part of the document sheets 5 and 6 passes through the openings 510 and 510b, it is possible to reduce attachment of dust such as paper powder, which is scattered from the document sheets 5 and 6, onto the reflection preventing members 73 and 73b.

It is possible to reduce accumulation of dust since the reflection preventing members 73 and 73b are covered during operation (during conveyance) in which dust is likely to be generated in the conveyance path 13 compared to time of non-operation in which conveyance is not performed. Thus, it is possible to decrease frequency of cleaning or replacement of the reflection preventing members 73 and 73b and to improve maintainability of the conveyance devices 10 and 10b.

The distance D1 is shorter than the distance between sheets of paper D2 and switching of the retracted state and the not-retracted state is performed for each of the document sheets 5 and 6. Thus, in a case where the plurality of document sheets 5 and 6 is successively conveyed, it is possible to detect the leading ends 5A and 6A of the document sheets 5 and 6 while reducing attachment of dust.

By arrangement of the reflection preventing members 73 and 73b on an outer side near a terminal of the carved conveyance path 13, it is possible to efficiently use a dead space as the lower spaces 55 and 55b and to downside the conveyance devices 10 and 10b.

Since the movable bodies 80 and 80b are rotated by a pressure from the document sheets 5 and 6, it is possible to bring the reflection preventing members 73 and 73b into the retracted state without utilization of a special drive source and actuator.

Since the paper sensor 18c is arranged in the upper spaces 65 and 65b and is not protruded to the conveyance path 13, it is possible to convey the document sheets 5 and 6 smoothly.

In the above-described embodiment, the reflection preventing members 73 and 73b are arranged on a lower side of the conveyance path 13. However, this is not the limitation. The reflection preventing members 73 and 73b may be arranged on an upper side and the paper sensor 18c may be arranged on a lower side. That is, the reflection preventing members 73 and 73b are arranged on one side of the conveyance path 13 and the paper sensor 18c is arranged on the other side (opposite side). An extension direction of the conveyance path 13 may be a horizontal direction, a vertical direction, or a different direction.

In a case of detecting the leading ends 5A and 6B of the document sheets 5 and 6 not only in vicinity of an upstream side of the first reading position P1 but also in vicinity of an upstream side of the image sensor 16, a reflection-type paper sensor is arranged on one side of the conveyance path 14 and a reflection preventing member is arranged on the other side. Then, similarly to the above-described embodiment, a not-retracted state and a retracted state of a reflection preventing member are switched by a movable body pushed and rotated by the document sheets 5 and 6.

In the above-described embodiment, the reflection-type paper sensor 18c is used. However, the paper sensor 18c may be replaced with a transmission-type. That is, the light-emitting member 71 and the light-receiving member 72 are arranged in such a manner as to face each other through the conveyance path 13. In this case, a movable body that moves a wall body, which covers a detection member (light-emitting member 71 or light-receiving member 72) arranged on one side of the conveyance path 13, or the detection member itself is provided in such a manner that the detection member is switched between a not-retracted state and a retracted state. A second movable body may be provided to switch a detection member, which is arranged on the other side, between the not-retracted state and the retracted state. In a case where the paper sensor 18c is the transmission-type, a light-emitting surface of a light-emitting member 71 or a light-receiving surface of a light-receiving member 72 is a main part of a detection member.

In the above-described embodiment, a description is made on the assumption that non-contact detection is performed optically with the paper sensor 18c. However, optical detection is not the limitation. A detection medium, which is other than light, such as an ultrasonic wave or magnetism may be used. In a case where a reflection-type sensor is used, a member with reflectivity of a detection medium other than light being greatly different from what the document sheets 5 and 6 have is used instead of the reflection preventing members 73 and 73b.

A device that conveys the document sheets 5 and 6 that are paper to be read has been described as an example of the conveyance devices 10 and 10b. However, the device may convey recording paper for printing or different paper.

A shape, size, and material of each of the movable bodies 80 and 80b, a shape and material of each of the conveyance guides 50 and 50b, a material of each of the reflection preventing members 73 and 73b, and the threshold th1 are not limited to what has been described as examples. For example, a material is not limited to resin and may be metal or a combination of resin and metal.

Moreover, a configuration of a whole or each part of each of the conveyance devices 10 and 10b and the image forming device 1, a color of a surface of a member, timing of operation of each part, or the like can be arbitrarily changed within the spirit of an embodiment of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A conveyance device that conveys paper through a conveyance path along a surface thereof, the device comprising:
    a conveyance guide that has a guide surface to be a wall surface on one side of the conveyance path, an opening being formed in the guide surface;
    a paper detection unit at least including a detection member, which is arranged in a space that communicates with the conveyance path through the opening, and configured to detect, with the detection member, a leading end of the paper that reaches the opening; and
    a movable body that brings the detection member into a retracted state, in which a main part thereof is covered from the space, after the leading end of the paper is detected.

2. The conveyance device according to claim 1, wherein the movable body is pushed and displaced by the paper and brings the detection member into the retracted state, and is displaced in such a manner as to be moved back and brings the detection member into a not-retracted state, in which the main part is not covered from the space, from the retracted state when being no longer pushed by the paper.

3. The conveyance device according to claim 2, wherein the movable body is pushed by the paper and keeps the detection member in the retracted state until a rear end of the paper passes through the opening.

4. The conveyance device according to claim 2, wherein the movable body is displaced by own weight or restoring force of a spring and brings the detection member into the not-retracted state from the retracted state.

5. The conveyance device according to claim 1, wherein a wall body to cover the main part is provided on one side of the conveyance path,
    the movable body includes
        a lever unit which is arranged in such a manner that one end part thereof is protruded from the space to the conveyance path and which can be rotated around a shaft provided on one side of the conveyance path, and
        a plate unit which is coupled to the other end part of the lever unit, supports the detection member, and is rotated in the space integrally with the lever unit, and
    the detection member is moved to a position facing the wall body and is brought into the retracted state when the lever unit and the plate unit are pushed by the paper and rotated in a retraction direction.

6. The conveyance device according to claim 5, wherein in a not-retracted state in which the main part of the detection member is not covered from the space, a front-surface direction of the main part is inclined to a detection axis in the paper detection unit in such a manner that a front side in the retraction direction of the main part is closer to the conveyance path than a rear side is.

7. The conveyance device according to claim 5, wherein a distance between an edge position on a downstream side in conveyance in a part of the lever unit, which part is abutted to the paper, of when the detection member is in the retracted state and a detection position in the conveyance path at which position a leading end of the paper is detected is shorter than a distance between sheets of paper of when a plurality of sheets of paper is conveyed successively.

8. The conveyance device according to claim 5, wherein the movable body is formed in a shape in which a hole or a notch is provided between the one end part of the lever unit and the plate unit.

9. The conveyance device according to claim 5, wherein a surface on the one end part of the lever unit which surface is abutted to the paper is inclined, at least when being abutted to the paper, in such a manner that a side close to a leading end in the one end part is on a downstream side in conveyance of a side far therefrom.

10. The conveyance device according to claim 1, wherein the movable body includes
    a lever unit which is arranged in such a manner that one end part thereof is protruded from the space to the conveyance path and which can be rotated around a shaft provided on one side of the conveyance path, and
    a plate unit which is coupled to the other end part of the lever unit and which is rotated in the space integrally with the lever unit, and
    the detection member is arranged fixedly in the space, and faces the plate unit and is brought into the retracted state when the lever unit and the plate unit are pushed and rotated by the paper.

11. The conveyance device according to claim 1, wherein the paper detection unit includes
    a light-emitting member that is arranged on an opposite side facing the conveyance guide through the conveyance path and that emits detection light toward the space, and
    a light-receiving member that is arranged on the opposite side and that outputs a signal corresponding to the amount of received detection light emitted from the light-emitting member and reflected, and
    the detection member is a reflection preventing member to reduce the amount of received light before the paper reaches the opening.

12. The conveyance device according to claim 11, wherein
    the reflection preventing member is a flocked cloth.

13. The conveyance device according to claim 11, wherein
in a not-retracted state in which the main part of the detection member is not covered from the space, a front-surface direction of the main part is inclined to a detection axis in the paper detection unit.

14. The conveyance device according to claim 1, wherein the one side of the conveyance path is a lower side.

15. The conveyance device according to claim 1, wherein the guide surface is curved in such a manner that the paper is bent in a front/back direction, and
the space is on an outer side of the curve near a terminal of the guide surface.

16. An image forming device comprising:
a conveyance device that conveys paper through a conveyance path along a surface thereof;
an image-reading unit that reads an image recorded on the paper; and
a printer unit that prints the read image onto recording paper different from the paper, wherein
the conveyance device includes
a conveyance guide including a guide surface to be a wall surface on one side of the conveyance path, an opening being formed in the guide surface,
a paper detection unit at least including a detection member, which is arranged in a space that communicates with the conveyance path through the opening, and configured to detect, with the detection member, a leading end of the paper that reaches the opening, and
a movable body that brings the detection member into a retracted state, in which a main part thereof is covered from the space, after the leading end of the paper is detected, and
the image-reading unit reads an image, which is recorded on the paper, on a downstream side of the opening.

17. The image forming device according to claim 16, wherein
the movable body is pushed and displaced by the paper and brings the detection member into the retracted state, and is displaced in such a manner as to be moved back and brings the detection member into a not-retracted state, in which the main part is not covered from the space, from the retracted state when being no longer pushed by the paper.

18. The image forming device according to claim 16, wherein
a wall body to cover the main part is provided on one side of the conveyance path,
the movable body includes
a lever unit which is arranged in such a manner that one end part thereof is protruded from the space to the conveyance path and which can be rotated around a shaft provided on one side of the conveyance path, and
a plate unit which is coupled to the other end part of the lever unit, supports the detection member, and is rotated in the space integrally with the lever unit, and
the detection member is moved to a position facing the wall body and is brought into the retracted state when the lever unit and the plate unit are pushed by the paper and rotated in a retraction direction.

19. The image forming device according to claim 16, wherein
the movable body includes
a lever unit which is arranged in such a manner that one end part thereof is protruded from the space to the conveyance path and which can be rotated around a shaft provided on one side of the conveyance path, and
a plate unit which is coupled to the other end part of the lever unit and which is rotated in the space integrally with the lever unit, and
the detection member is arranged fixedly in the space, and faces the plate unit and is brought into the retracted state when the lever unit and the plate unit are pushed and rotated by the paper.

20. The image forming device according to claim 16, wherein
the paper detection unit includes
a light-emitting member that is arranged on an opposite side facing the conveyance guide through the conveyance path and that emits detection light toward the space, and
a light-receiving member that is arranged on the opposite side and that outputs a signal corresponding to the amount of received detection light emitted from the light-emitting member and reflected, and
the detection member is a reflection preventing member to reduce the amount of received light before the paper reaches the opening.

* * * * *